United States Patent [19]

Kozinski

[11] Patent Number: 5,493,875
[45] Date of Patent: Feb. 27, 1996

[54] VEHICLE AIR CONDITIONING SYSTEM UTILIZING REFRIGERANT RECIRCULATION WITHIN THE EVAPORATOR/ACCUMULATOR CIRCUIT

[76] Inventor: Richard C. Kozinski, 27671 Dowland, Warren, Mich. 48092

[21] Appl. No.: 283,642

[22] Filed: Aug. 1, 1994

[51] Int. Cl.$^6$ .................................................. F25B 43/00
[52] U.S. Cl. .................. 62/503; 62/512; 62/500
[58] Field of Search ............................ 62/503, 500, 512, 62/509

[56] References Cited

U.S. PATENT DOCUMENTS

| | | | |
|---|---|---|---|
| 2,123,021 | 7/1938 | Phillips | 62/500 X |
| 2,159,251 | 5/1939 | Brizzolara . | |
| 2,164,081 | 6/1939 | Phillips . | |
| 2,466,863 | 4/1949 | Phillips | 62/512 X |
| 3,084,523 | 4/1963 | Bottum et al. . | |
| 3,087,312 | 4/1963 | White . | |
| 3,196,634 | 7/1965 | Rich | 62/512 X |
| 3,264,837 | 8/1966 | Harnish . | |
| 3,381,487 | 5/1968 | Harnish . | |
| 3,648,480 | 5/1972 | Watts . | |
| 3,766,748 | 10/1973 | Bottum et al. . | |
| 3,977,205 | 8/1976 | Dreisziger et al. . | |
| 4,187,695 | 2/1980 | Schumacher | 62/503 |
| 4,194,367 | 3/1980 | Lavik | 62/503 |
| 4,794,765 | 1/1989 | Carella et al. | 62/512 |
| 4,905,480 | 3/1990 | Bostrom . | |
| 4,909,046 | 5/1990 | Johnson . | |
| 5,076,065 | 12/1991 | Brogan . | |

OTHER PUBLICATIONS

Orifice/Accumulator/Clutch Cycle, "A Simplified Refrigerant Control System", Harrison Radiator Division, Lockport, New Yor, May 13, 1971.

Primary Examiner—Harry B. Tanner
Attorney, Agent, or Firm—Dykema Gossett

[57] ABSTRACT

The air conditioning system contains a refrigerant and comprises a compressor having an inlet and an outlet, a condenser having an inlet and an outlet, an evaporator having an inlet and an outlet and a suction conduit connecting the outlet of the evaporator to the inlet of the compressor where the refrigerant returns to the compressor as a low pressure vapor. A discharge conduit is provided which connects the outlet of the compressor to the condenser where upon removal of heat of the vapor, the gas becomes a high pressure liquid refrigerant. A liquid conduit having an injector and restrictor connects the outlet of the condenser to the inlet of the evaporator. An accumulator having an inlet port and an outlet port is interposed in the suction conduit. A liquid discharge port is also provided in the accumulator. A recirculating conduit connects the discharge port to the liquid conduit. The accumulator contains a baffle or other means which helps to separate the refrigerant vapor from the refrigerant liquid, whereby the vapor is directed to the inlet of the compressor through the suction conduit. The separated liquid is stored in the accumulator and is thereafter recirculated through the discharge port and the recirculating conduit to the liquid conduit and to the evaporator thereby bypassing the compressor and the condenser. The recirculation is via the injector which utilizes the velocity of the refrigerant in the liquid conduit to draw refrigerant from the accumulator.

6 Claims, 2 Drawing Sheets

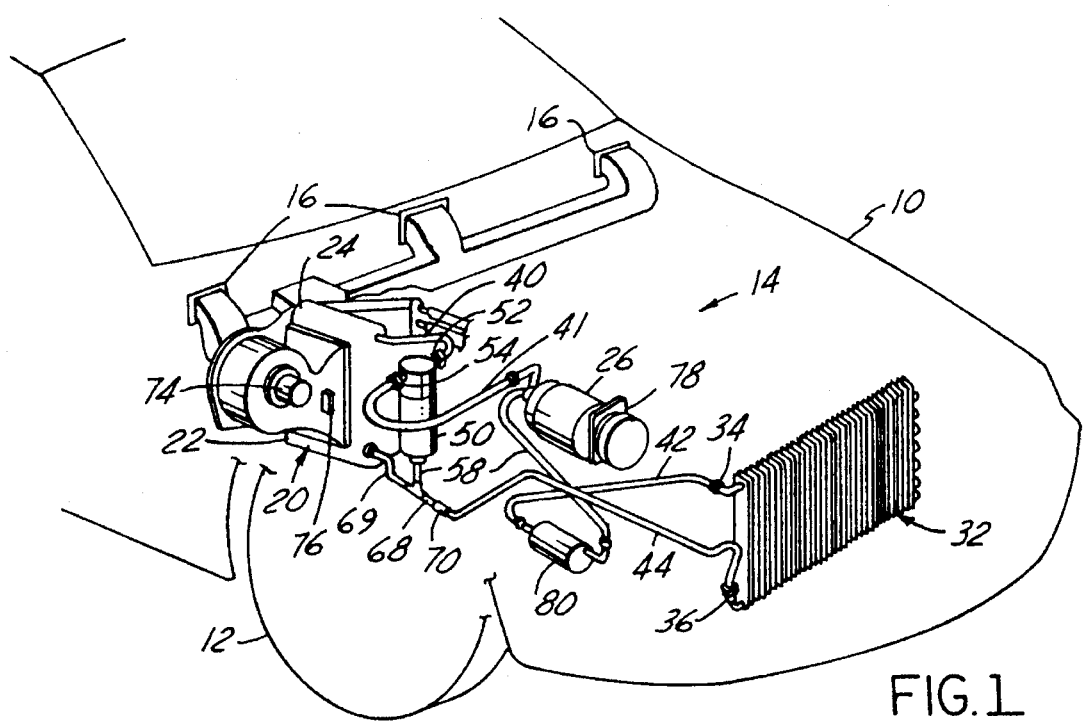
FIG. 1
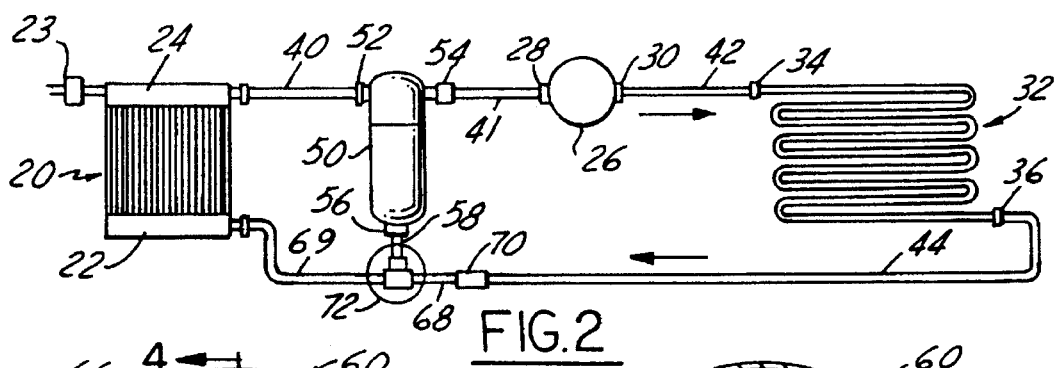
FIG. 2
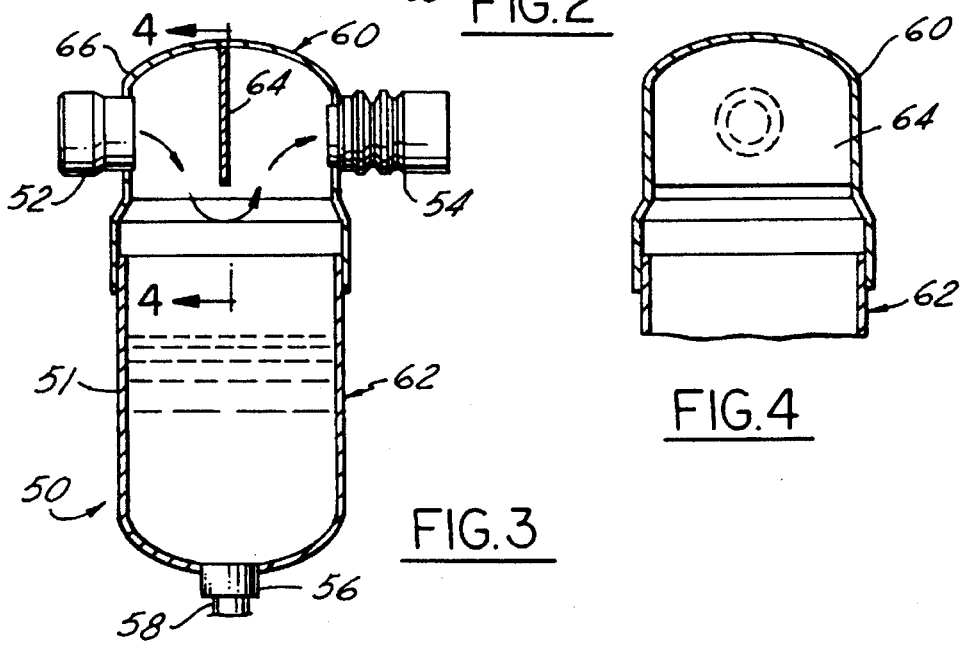
FIG. 3
FIG. 4

VEHICLE AIR CONDITIONING SYSTEM UTILIZING REFRIGERANT RECIRCULATION WITHIN THE EVAPORATOR/ACCUMULATOR CIRCUIT

BACKGROUND OF THE INVENTION

Today's vehicle air conditioning system is comprised of the compressor which is engine driven or driven by other means such as an electric motor, an evaporator and a condenser which are all connected together in an operative relationship within the system. Refrigerant flow control means are provided between the condenser and evaporator. With a fixed capillary or orifice or orifice tube refrigerant flow control an accumulator is usually provided between the evaporator and compressor so that the system will be effective under variable vehicle speed and load conditions.

The accumulator of the prior art stores and releases refrigerant into the rest of the system as required since a fixed restriction system requires a specific charge at each operating condition. The accumulator also separates the liquid from the gas refrigerant. It also provides refrigerant charge tolerance for ease of production and provides a reserve in case of future small leakage of refrigerant which is prevalent in today's vehicle systems.

In current designs or prior art devices, fixed restrictor vehicle air conditioning systems incorporate an "oil bleed hole" in the "U" tube of the suction accumulator which returns oil and liquid refrigerant to the compressor. A typical "U" tube construction is shown in U.S. Pat. No. 3,084,523, which issued to E. W. Bottum et al. on Apr. 9, 1963. The amount of liquid return in larger part determines the amount of evaporator "flooding" and the speed at which additional refrigerant is introduced into the operating system when conditions require more charge. The drawbacks of this liquid return to the compressor include a reduction in compressor capacity as compared to only gas being returned to the compressor, increased power consumption and a possibility of compressor damage due to oil dilution and "liquid slugging" especially on start-up when the accumulator "U" tube can be significantly filled. Also pressure drop and cost are disadvantages of the "U" tube design.

Simple elimination of the liquid return would result in oil being trapped in the accumulator and a slow response to additional refrigerant requirements as loads and capacities are varied since the additional refrigerant required would have to be evaporated from the accumulator.

SUMMARY OF THE INVENTION

A feature of the present invention is to eliminate the liquid bleed to the compressor from the accumulator (and to eliminate its disadvantages) while still maintaining coil flooding, oil return to the compressor and system stability during transient load and car speed conditions where various refrigerant charges are required especially in the condenser to provide effective cooling performance.

Another feature of the present invention is to provide an air conditioning system which utilizes a means of drawing liquid refrigerant from the accumulator to recirculate it constantly through the evaporator coil and back to the accumulator while the system is operating.

Still another feature of the present invention is to provide an air conditioning system which utilizes the velocity of the expanded refrigerant at or downstream of the expansion device to draw refrigerant from the accumulator and recirculate it constantly through the evaporator coil and back to the accumulator while the system is operating.

A further feature of the present invention is to provide an automotive or vehicle air conditioning system which utilizes the velocity of the refrigerant at or after the expansion device to lower the static pressure below that in the accumulator and entrain refrigerant to that entering the evaporator. This is similar to a paint spray gun drawing paint into the high velocity stream of air. The extra refrigerant circulated with this invention improves evaporator coil performance in applications where refrigerant distribution within the coil is not uniform and some "hot spots" exist. Refrigerant side heat transfer coefficient is also increased. The device to recirculate the accumulator refrigerant can be a simple tee up to a sophisticated venturi. The device, hereinafter called an injector, may be mounted outside or inside the accumulator.

IN THE DRAWINGS

FIG. 1 is a pictorial view of the component parts of an automobile air conditioning system;

FIG. 2 is a diagrammatic view of the vehicle air conditioning system shown in FIG. 1;

FIG. 3 is a sectional view through the accumulator;

FIG. 4 is a fragmentary view of the accumulator taken on the line 4—4 of FIG. 3;

DESCRIPTION OF THE EMBODIMENT

Figure 5:
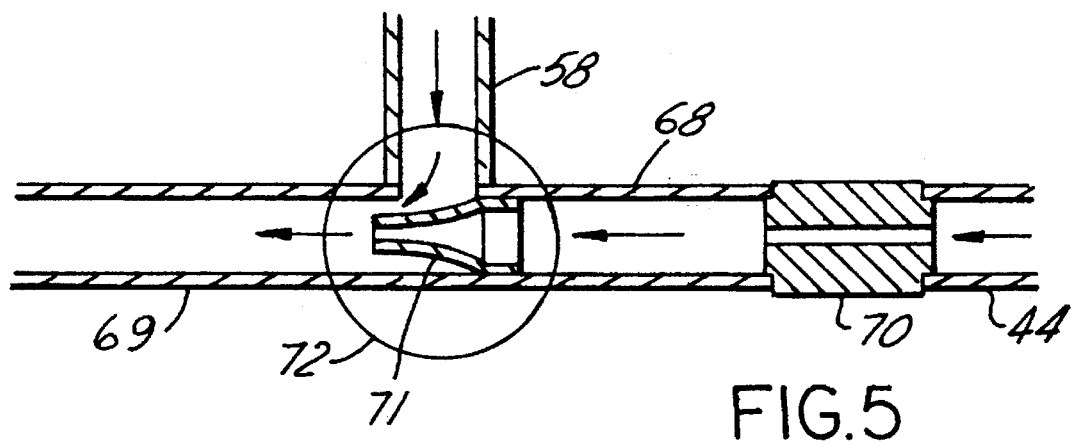
FIG. 5 is a fragmentary enlarged view of the injector located downstream of the restrictor.

Referring now to FIG. 1 where there is shown an automobile 10 having tires 12 and an air conditioning system 14 generally located under the hood of the automobile. The vehicle 10 is provided with air conditioning outlets 16 which directs the air conditioned air into the interior of the vehicle 10.

The air conditioning system 14 includes an evaporator 20 having an inlet 22 and an outlet 24, a compressor 26 having an inlet 28 and an outlet 30, a condenser 32 in the form of a coil having an entrance 34 and an outlet 36. The component parts just described are connected in the air conditioning system 14 by conduits including suction conduits 40 and 41 connecting the evaporator outlet 24 to the inlet 28 of compressor 26. A discharge conduit 42 connects the outlet 30 of compressor 26 to the inlet 34 of the coil condenser 32. The system 14 also includes a liquid conduit 44 which connects the outlet 36 of the condenser 32 to the inlet 22 of the evaporator 20.

The air conditioning system 14 also includes an accumulator 50 having a housing 51 provided with an inlet 52 and an outlet 54 in the upper part 60 of the housing 51. The bottom part 62 of the housing 51 has a discharge port 56. The present invention distinguishes over prior art devices which have utilized accumulators in air conditioning systems. The novel feature includes a provision of a discharge port 56 generally near the bottom part 62 of the housing 51. The discharge port 56 is connected by a recirculating line conduit 58 to conduit segments 68 and 69 which form parts of the liquid conduit 44.

The housing 51, as indicated previously, has an upper housing part 60 which is mounted on the lower housing part 62. The inlet and outlet parts 52 and 54 are provided in the upper housing part 60. The accumulator 50 includes a baffle 64 which depends vertically from the top wall 66 of the accumulator 50. The baffle 64 extends between the inlet and outlet ports 52, 54 whereby the refrigerant entering the accumulator 50 strikes the baffle 64 and assists in separating the vapors or gases from the liquid. In such a situation, the liquid falls out while the gas or vapors rises in the housing 51 moving around the baffle 64 to the outlet port 54 and from there to the compressor 26 as will be discussed later. The design of the accumulator 50 is important in that it effectively separates liquid from gas and has the liquid port for recirculating the refrigerant and oil. Its size is dependent on charge tolerance desires. Gas velocities within the accumulator 50 must be high enough to carry entrained oil to the compressor suction line 41. Most automotive compressor designs in use today use no oil sump and this continuous suction gas oil flow is necessary for adequate lubrication. The accumulator 50 will have varying levels of liquid depending on system operating conditions. As shown in FIG. 2, liquid conduit 44 is provided with a restrictor 70 for controlling the flow of the refrigerant. Conduit 68 connects the restrictor 70 to the tee connection formed by intersecting conduits 58, 68 and 69 where a nozzle 71 is located to form an injector 72 as shown in FIG. 5. The injector nozzle 71 is in the form of a venturi and is connected to the evaporator inlet 22 by the conduit or conduit segment 69.

In FIG. 5, the injector nozzle 71 and restrictor 70 are shown mounted in the liquid conduit 44 outside of the accumulator 50. As an alternate construction, both the injector nozzle 71 and the restrictor 70 could be located inside the accumulator 50 if the liquid line passed through the accumulator 50 near the bottom thereof. Also, the accumulator and evaporator could be integrally connected as a single unit.

Figure 6:
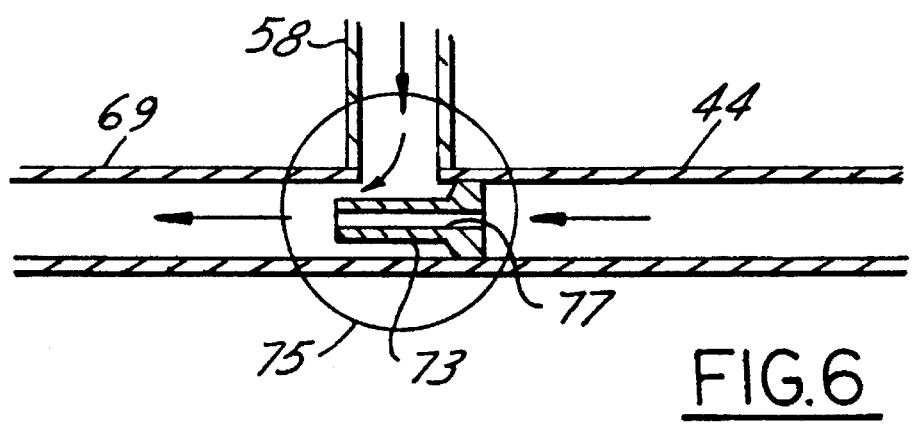
FIG. 6 is a fragmentary enlarged view of another embodiment, with a restrictor forming the injector located at the intersection of the recirculating line conduit and the liquid conduit.

In the modified embodiment of FIG. 6, a restrictor 73 is located at the intersection of the conduits 58, 44 and 69 to form the injector 75. In such an embodiment, the restrictor 73 is used as a nozzle. Flow from conduit 58 is permitted around the restrictor 73 to passage 69. Flow from conduit 44 is also directed to conduit 69 through the passage 77 in restrictor 73.

The air conditioning system 14 as shown in FIGS. 1 and 2, further includes additional conventional components including an evaporator blower 74, a cycling thermostatic switch 76, a compressor clutch 78 and a muffler 80. A low pressure switch 23 is provided in the suction side in lieu of the cycling thermostatic switch. This is used in most systems today for coil anti-freeze control.

In operation, refrigerant gas, with very little liquid enters the compressor 26 via the inlet 28. The compressed gas exits the compressor at a higher pressure and at a higher temperature at 30 and is directed via the conduit 42 to the inlet 34 of the condenser 32. The compressed gas exiting the compressor 26 is at a higher temperature than the ambient temperature of the condenser 32. The gas is condensed to a liquid and exits the condenser 32 at 36 from where the liquid travels through the liquid line 44 to the fixed or variable restrictor 70. The refrigerant in line 68 flows through a smaller line called the injector nozzle 71 at a high enough velocity to reduce the static pressure at the opening of the conduit or tube 58 leading from the accumulator 50. The reduction in pressure draws liquid oil and refrigerant from the housing 51 via the port 56 and conduit 58 into the stream of refrigerant flowing in conduit 69 into the evaporator 20.

The liquid and gas refrigerant exiting the outlet 24 of evaporator 20 travels via conduit 40 into the accumulator 50. The mixture of refrigerant gas and liquid enters the accumulator 50 via the inlet port 52 where the gas rises around the baffle 64 and the liquid striking the baffle 64 is collected in the lower housing part 62. This liquid is constantly recirculated during the system operation. The gas refrigerant from the accumulator 50 is directed via the outlet port 54 to the compressor 26 where the cycle is repeated. Less liquid refrigerant flows back to the compressor 26 with the present invention as compared to current systems using an accumulator resulting in an improved system performance with less power required to operate the compressor along with other advantages discussed herein.

The suction line 40 leading from the evaporator 20 to the accumulator 50 contains vapor and liquid refrigerant at low pressure and at low temperature. The conduit 41 leading from the accumulator 50 to the compressor 26 contains mostly a gas at a low pressure and low temperature. The compressor 26 discharges the gas at a high pressure, high temperature via the line 42 leading to the entrance 34 to the condenser 32. The liquid line 44 leading from the discharge port of condenser 32 is at high pressure and it is this high pressure liquid being expanded via the restrictor 70 which creates the high velocity of the expanded refrigerant at the injector 72.

As illustrated and described with the present invention, there has been provided an efficient means of removing liquid from the accumulator 50 and directing it into the evaporator 20 in a continuous fashion during operation of the vehicle air conditioning system 14. The present invention has an advantage over the prior art in that liquid slugging to the compressor is eliminated and the power required to operate the compressor is reduced. In addition, the pressures of the gas from the compressor 26 are reduced since less refrigerant flow must be condensed to achieve equal evaporator cooling within the system.

The cooling stability of the evaporator 20 is enhanced during transient load conditions such as when the vehicle is accelerating after idle since refrigerant flow from the accumulator makes up some of the shortfall in flow from the condenser during these conditions in which condensing pressure falls rapidly starving the evaporator in current designs.

Current evaporator coils used in automotive applications are usually of the plate fin construction. Single pass designs utilizing an upper and lower tank usually suffer from poor refrigerant distribution. Recent plate fin designs utilize a three pass system to improve refrigerant distribution but at a high refrigerant pressure drop and higher manufacturing cost. This invention significantly improves the single pass coil performance. The extra refrigerant flow through the evaporator increases heat transfer coefficient and helps eliminate "hot spots" from poor distribution in evaporator coil designs whether single pass or multiple pass.

As mentioned previously, the conduit 58, restrictor 70 and injector 72 may be incorporated within the accumulator bottom along with parts of conduits 44, 68s and 69. Also, the accumulator 50 can be designed as an integral part of the evaporator with an expected cost savings over the separate accumulator design.

Another advantage of this invention is a reduction in refrigerant flow noise from the evaporator due to the entrainment of liquid into the high velocity liquid gas mixture.

Oil flow to the compressor is by way of oil entrainment in the suction gas. This is similar to what occurs in thermostatic expansion valve systems which do not use an accumulator.

The evaporator capacity control of the air conditioning system is accomplished via one or a combination of the following: a thermostatic evaporator temperature switch controlling the compressor on-off; a suction pressure switch controlling the compressor on-off; a suction side evaporator pressure control valve; a suction side temperature controlled suction throttling valve; a variable speed compressor; a variable displacement compressor; a discharge air thermostat; and/or a space temperature thermostat.

The air conditioning system of the present invention has improved cooling performance over conventional fixed restrictor systems which utilize an accumulator with an oil bleed. It also requires less power to drive the compressor. The compressor head pressure is also reduced. The system eliminates "liquid slugging" and provides improved transient cooling stability. The system reduces orifice (restrictor) flow noise and also reduces enthalpy of refrigerant entering the evaporator due to work used in recirculation. The air conditioning system also provides greater evaporator capacity at a given suction pressure due to more coil flooding and increased refrigerant side heat transfer coefficient. Finally, the present invention reduces complexity of the design of an accumulator when compared with the design and manufacture of a "U" tube design as currently used.

Which I claim is:

1. An air conditioning system containing a refrigerant comprising a compressor having an inlet and an outlet, a condenser having an inlet and an outlet, an evaporator having an inlet and an outlet, a suction conduit connecting the outlet of said evaporator to the inlet of said compressor where the refrigerant returns to the compressor as a low pressure vapor, a discharge conduit connecting the outlet of said compressor to said condenser where upon removal of heat the vapor becomes a high pressure liquid refrigerant, a liquid conduit connecting the outlet of said condenser to the inlet of said evaporator, and an accumulator having an inlet port and an outlet port interposed in said suction conduit, said ports having generally the same axis, said accumulator including an accumulator housing having an upper portion and a lower portion, with said inlet and outlet ports being located in said upper portion, a liquid discharge port in the lower portion of said accumulator housing, a liquid recirculating conduit connecting said discharge port to said liquid conduit, said accumulator housing having a baffle carried by the upper portion of said housing and arranged generally perpendicular to said axis between said inlet and outlet ports to separate the refrigerant vapor from the refrigerant liquid when the combined liquid and vapor refrigerant enters the inlet port of accumulator housing from said evaporator, whereby the separated vapor is directed by said baffle to the inlet of said compressor through said suction conduit and the separated liquid is stored in the lower portion of said accumulator housing and is thereafter recirculated through said liquid discharge port and said liquid recirculating conduit to said liquid conduit and to said evaporator thereby bypassing said condenser and said compressor.

2. The air conditioning system of claim 1, wherein a restrictor and an injector are interposed in said liquid conduit, with the recirculation of the liquid being accomplished via said injector utilizing the velocity of the refrigerant after said restrictor.

3. The air conditioning system of claim 2, wherein said restrictor is located in the nozzle of said injector.

4. The air conditioning system of claim 1, wherein the portion of said liquid conduit between said accumulator and said evaporator is provided with an injector which draws liquid from said accumulator through said recirculating conduit.

5. The air conditioning system of claim 1, wherein the liquid conduit between said condenser and said evaporator is provided with a restrictor for purpose of flow control.

6. The air conditioning system of claim 5, wherein said restrictor is of a fixed size.

* * * * *